United States Patent [19]
Sathe et al.

[11] Patent Number: 5,617,417
[45] Date of Patent: Apr. 1, 1997

[54] ASYNCHRONOUS TRANSFER MODE COMMUNICATION IN INVERSE MULTIPLEXING OVER MULTIPLE COMMUNICATION LINKS

[75] Inventors: Shirish K. Sathe, Cupertino; Charles M. Corbalis, Saratoga, both of Calif.; Uri Schmidt, Azor, Israel; Richard M. Moley, Saratoga, Calif.

[73] Assignee: Stratacom, Inc., San Jose, Calif.

[21] Appl. No.: 301,854

[22] Filed: Sep. 7, 1994

[51] Int. Cl.⁶ .................................................. H04L 12/56
[52] U.S. Cl. .......................... 370/394; 370/395; 370/471
[58] Field of Search .................................. 370/14, 17, 42, 370/43, 60.1, 78, 94.2, 108, 112, 60, 94.1

[56] References Cited

U.S. PATENT DOCUMENTS

| 5,293,570 | 3/1994 | Schmidt et al. | 370/60.1 |
| 5,400,324 | 3/1995 | Erilsson | 370/94.2 |
| 5,404,354 | 4/1995 | Hayter et al. | 370/94.2 |

FOREIGN PATENT DOCUMENTS

| 9012467 | 10/1990 | WIPO . |
| 9303569 | 2/1993 | WIPO . |

OTHER PUBLICATIONS

PCT Notification of Transmittal of the International Search Report or the Declaration for International Application No. PCT/US95/10218, 7 pages (Dec. 5, 1995).

Katsuyuki Yamazaki et al., "ATM Transport with Dynamic Capacity Control for Interconnection of Private Networks," IEICE Transactions Comm., vol. E77–B, No. 3, pp. 327–334 (Mar. 1994).

I. Widjaja et al., "A High–Capacity Broadband Packet Switch Architecture Based on Multilink Approach," Milcom '92 Communications—Fusing Command, Control and Intelligence.

Conference Record (Cat. No. 92CH3131–0), San Diego, California, IEEE, pp. 154–158 ISBN 0–7803–0585–X (New York, New York Oct. 11, 1992).

*Primary Examiner*—Benedict V. Safourek
*Assistant Examiner*—Ricky Q. Ngo
*Attorney, Agent, or Firm*—Blakely, Sokoloff, Taylor & Zafman

[57] ABSTRACT

An asynchronous transfer mode inverse multiplexed communication system is disclosed wherein a series of communication cells are multiplexed over a set of communication links. Each communication cell includes a framing bit of a predetermined framing bit stream for each communication link and a control channel bit of a control message for each communication link. Inbound communication cells from each communication link are aligned according to the corresponding framing bit stream. The control message specifies an ordered list of logical identifiers to indicate a multiplexed sequence of transfer of the communication cells over the communication links.

6 Claims, 12 Drawing Sheets

| Bit 1 | Bit 2 | Bit 3 | Bit 4 | Bits 5-8 | |
|---|---|---|---|---|---|
| 0 | 0 | BF | CC | | Byte 1 |
| | | | | | Byte 2 |
| | | | | | Byte 3 |
| | | | | | Byte 4 |
| CRC 8 | | | | | Byte 5 |
| Payload | | | | | Bytes 6..53 |

*Figure 4*

|  | Sub Frame 00 | Sub Frame 01 | Sub Frame 02 |
|---|---|---|---|
| Cell # | 0 1 2 3 4 5 6 7 | 8 9 10 11 12 13 14 15 | 16 17 18 19 20 21 22 23 |
| BF Bit | 1 0 1 x 0 0 0 0 | 1 0 1 1 0 0 0 1 | 1 0 1 1 0 0 0 1 |

*Figure 7*

| Octet 1 | Octet 2 | Octet 3 | Octet 4 | Octet 5 | ... | Octet 32 |
|---|---|---|---|---|---|---|
| Preamble+ID | LID | STATE | Nmax | LID | ... | LID |
| 1111 : xxxx | | | 00..28 | | ... | |

| BF | Sub Frame 0 | SF 1 | SF 2 | SF 3 | SF 4 | SF 5 | SF 6 | SF 7 |
|---|---|---|---|---|---|---|---|---|
| CC | 1010 0000 | 1011 0001 | 1011 0010 | 1011 0011 | 1011 0100 | 1011 0101 | 1011 0110 | 1011 0111 |
|  | Header Octet 1 | CHLID | STATE | Nmax | LID 1 | LID 2 | LID 3 | LID 4 |
| BF | SF 8 | SF 9 | SF 10 | SF 11 | SF 12 | SF 13 | SF 14 | SF 15 |
| CC | 1011 1000 | 1011 1001 | 1011 1010 | 1011 1011 | 1011 1100 | 1011 1101 | 1011 1110 | 1011 1111 |
|  | LID 5 | LID 6 | LID 7 | LID 8 | LID 9 | LID 10 | LID 11 | LID 12 |
| BF | Sub Frame 0 | SF 1 | SF 2 | SF 3 | SF 4 | SF 5 | SF 6 | SF 7 |
| CC | 1011 0000 | 1011 0001 | 1011 0010 | 1011 0011 | 1011 0100 | 1011 0101 | 1011 0110 | 1011 0111 |
|  | LID 13 | LID 14 | LID 15 | LID 16 | LID 17 | LID 18 | LID 19 | LID 20 |
| BF | SF 8 | SF 9 | SF 10 | SF 11 | SF 12 | SF 13 | SF 14 | SF 15 |
| CC | 1011 1000 | 1011 1001 | 1011 1010 | 1011 1011 | 1011 1100 | 1011 1101 | 1011 1110 | 1011 1111 |
|  | LID 21 | LID 22 | LID 23 | LID 24 | LID 25 | LID 26 | LID 27 | LID 28 |

| Octet 1 | Octet 2 | Octet 3 | Octet 4 | Octet 5 | Octet 6 | Octet 7 | Octet 8 | 9... | ...32 |
|---|---|---|---|---|---|---|---|---|---|
| Preamble+ID | LID | STATE | Nmax | LID | LID | LID | LID | LID | LID |
| 1111:11 00 | 000 00111 | 1110 0010 | 4 | 7 | 8 | 10 | 11 | xx | xx |
| 1111:1 000 | 000 01000 | 1110 0010 | xx | xx | xx | xx | xx | xx | xx |
| 1111:1000 | 000 01010 | 1110 0010 | xx | xx | xx | xx | xx | xx | xx |
| 1111:1000 | 000 01011 | 1110 0010 | xx | xx | xx | xx | xx | xx | xx |

*Figure 11b*

ASYNCHRONOUS TRANSFER MODE COMMUNICATION IN INVERSE MULTIPLEXING OVER MULTIPLE COMMUNICATION LINKS

BACKGROUND OF THE INVENTION

1. Field of the Invention

The present invention pertains to the field of digital communications. More particularly, this invention relates to a system for inverse multiplexing data transmission over multiple communication links in an asynchronous transfer mode communication network.

2. Background

Packet switching communication networks are commonly employed to transfer digital information over long distances. Such packet switching communication networks are also referred to as cell switching communication networks. One type of packet switching communication network is an asynchronous transfer mode communication network. An asynchronous transfer mode communication network enables the transfer of digital voice information, digital video information and digital data over short or long distances via common carrier communication links. Such a communication network enables a wide variety of communication devices to share common carrier communication links on a demand driven basis. For example, such asynchronous transfer mode communication networks are commonly employed for a wide area network (WAN) communication.

The common carrier communication links employed in such asynchronous transfer mode communication networks typically include relatively low speed metal wire based communication links. One such type of relatively low speed common carrier communication link available in North America is the T1 communication link. A typical T1 communication link provides a maximum data rate of 1.544 megabits per second. Similarly, the E1 common carrier communication links available in Europe provide a relatively low maximum data rate of 2.048 megabits per second.

In addition, the common carrier communication links employed in such asynchronous transfer mode communication networks usually include higher speed optical based communication links. An example of such a high speed common carrier communication link available in North America is the T3 communication link which provides a maximum data rate of 45 megabits per second. An example of a high speed common carrier communication link available in Europe is the E3 communication link which provides a maximum data rate of 34 megabits per second.

Prior asynchronous transfer mode communication networks that require high bandwidth communication links typically employ T3 or E3 communication links rather than the lower speed T1 or E1 communication links. Unfortunately, the subscription rates for such T3 common carrier communication links are usually much higher than the subscription rates for T1 or E1 links. Moreover, in North America such T3 common carrier communication links are not as widely available as T1 common carrier communication links. Worse yet, in Europe E3 common carrier communication links are rarely available and E1 common carrier communication links have only recently become widely available.

As a consequence, communication services requiring such high bandwidth communication links typically require a high premium payment for such high speed common carrier communication links. Moreover, such required high speed communication links may not be available in some areas for such an asynchronous transfer mode communication network.

In addition, some prior asynchronous transfer mode communication networks require communication links with a bandwidth higher than is provided by low speed common carrier communication links such as T1 or E1 but do not require the high bandwidth of the T3 or E3 common carrier communication links. Unfortunately, communication services requiring such medium level bandwidth communication links must typically employ expensive high speed common carrier communication links even though the full bandwidth range is not needed. For example, an asynchronous transfer mode communication network requiring a maximum data rate of 10 or 20 megabits per second must usually employ high speed T3 or E3 common carrier communication links. Such high speed common carrier links unnecessarily increase the cost of communication for subscribers to such an asynchronous transfer mode communication networks.

SUMMARY AND OBJECTS OF THE INVENTION

One object of the present invention is to carry high speed asynchronous transfer mode connections over multiple low speed communication links.

Another object of the present invention is to enable asynchronous transfer mode communication over multiple low speed communication links and to compensate for the differing delays associated with the multiple communication links.

A further object of the present invention is to dynamically reconfigure the number of active links of the multiple low speed communication links as errors are detected on low speed communication links.

A further object of the present invention is to remove individual low speed communication links that fail.

Another object of the present invention is to restore a previously failed low speed communication link after removal of the failure by, for example, a common carrier reroute.

Another object of the present invention is to dynamically reconfigure the multiple low speed communication links according to the bandwidth capacity required between peak capacity periods in the asynchronous transfer mode communication network.

Another object of the present invention is to properly reconstruct a cell transmission sequence in an asynchronous transfer mode communication network while compensating for differing delays associated with each individual low speed communication link.

These and other objects of the invention are provided by an asynchronous transfer mode inverse multiplexed communication system, wherein a series of communication cells are multiplexed over each of a set of communication links. Each communication cell includes a framing bit such that the flaming bits provide a predetermined framing bit stream for each communication link. On the receiving side, the inbound communication cells from each communication link are aligned according to the corresponding framing bit stream. The alignment provided by the framing bit streams enables compensation for the differing delays associated with each communication link.

Each communication cell includes a control channel bit such that the control channel bits provide a control message for each communication link. The control message specifies an ordered list of the logical identifiers such that the ordered list indicates a multiplexed sequence of transfer of the communication cells over the communication links. Control messages are used to delete a failed communication link from the set of communication links and to restore the failed communication link after removal of the failure.

The predetermined framing bit stream enables the determination of differential delays among multiple communication links. If the differential delays are excessive and beyond a maximum allowable limit, then the inverse multiplexed connection may be rejected. If the differential delays are within a permissible limit, then the framing bit stream is used to compensate for the relative delays to recreate the original high speed cell sequence. The framing bit stream also enables the alignment of control channel messages.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which:

FIG. 4 illustrates the format of each communication cell transferred over the communication links wherein each communication cell comprises 53 bytes including a 5 byte header and a 48 byte payload;

FIG. 7 illustrates the format of a master framing bit stream which is used to determine the relative transmission delays among the communication links and to realign the cell streams transmitted over the communication links into the inbound delay compensation buffer;

FIG. 8 illustrates the control channel message which carries fixed length control messages between the master communication node and the slave communication node;

FIG. 9 illustrates the complete master framing sequence provided by the bundle framing bits and a complete control message provided by the channel control bits;

FIG. 11b illustrates the format of a control message carried over each of the communication links corresponding to the link identifiers 7, 8, 10 and 11.

DETAILED DESCRIPTION

Figure 1:
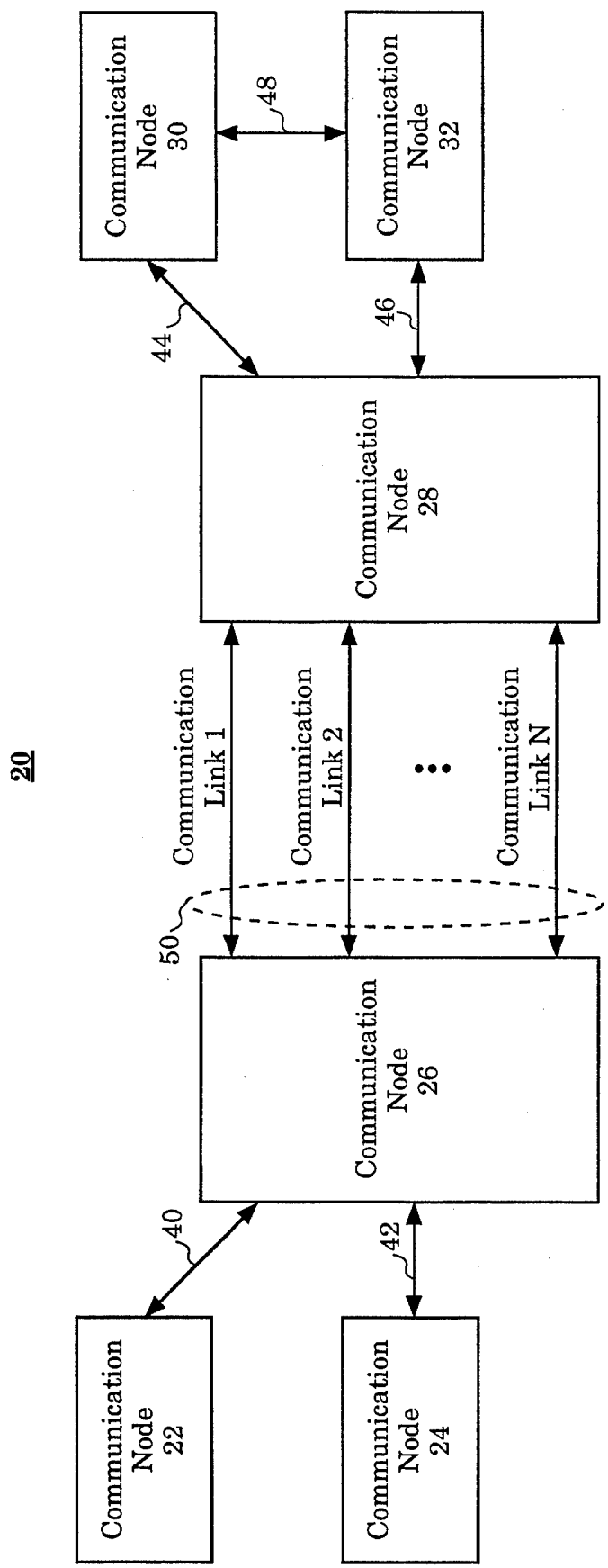
FIG. 1 illustrates a communication network for one embodiment which comprises a set of communication nodes coupled for communication over a set of communication links.

FIG. 1 illustrates a communication network 20 for one embodiment. The communication network 20 comprises a set of communication nodes 22–32 coupled for communication over a set of communication links 40–48 and a set of communication links 50. The communication network 20 enables communication according to an asynchronous transfer mode communication protocol.

The communication nodes 26 and 28 enable point to point inversed multiplexed asynchronous transfer mode communication via the communication links 50. The communication links 50 comprise a set of communication links 1–N. For one embodiment, each of the communication links 1–N comprises a T1 common carrier communication link. For another embodiment, each of the communication links 1–N comprises an E1 common carrier communication link.

The communication nodes 26 and 28 exchange streams of communication cells via the communication links 1–N. The aggregate bandwidth of the communication links 1–N provides point to point communications between the communication nodes 26 and 28 at an effective data rate of N times the data rate of each of the individual communication links 1–N. For example, in an embodiment wherein the communication links 50 comprise a set of four T1 common carrier communication links the maximum effective data rate communication between the communication nodes 26 and 28 is 4×1.536 megabits per second.

The communication node 26 transfers outbound sequences of communication cells to the communication node 28 by inverse multiplexing the outbound communication cells over the communication links 1–N in a round robin fashion. The communication node 28 receives inversed multiplexed inbound communication cells from the communication node 26 over the communication links 1–N and reconstructs the original sequence of communication cells. The communication node 28 compensates for the differing delays associated with each of the communication links 1–N.

Similarly, the communication node 28 inverses multiplexes outbound sequences of communication cells to the communication node 26 over the communication links 1–N in a round robin fashion. The communication node 28 receives the inversed multiplexed inbound communication cells over the communication links 1–N and reconstructs the original sequence of communication cells while compensating for the differing delays associated with each of the communication links 1–N.

The communication nodes 26 and 28 transmit master framing sequences over each of the communication links 1–N to coordinate the transfer of communication cells over the communication links 1–N. For one embodiment, the master framing sequences each comprise 1 bit from each communication cells transferred over each communication link 1–N.

The communication nodes 26 and 28 exchange channel control information via channel control messages transferred over the communication links 1–N. For one embodiment, the channel control messages comprise one bit from each communication cell transferred over each communication link 1–N. The channel control messaging structure designates one of the communication nodes 26 or 28 as the "master" communication node and designates the other of the communication nodes 26 or 28 as the "slave" communication node.

The communication nodes 26 and 28 provide full duplex inversed multiplexed asynchronous transfer mode communication via the communication links 1–N. For purposes of illustration, however, only communication cell transmission from the communication node 26 to the communication node 28 is hereinafter described. The communication node 26 is hereinafter designated the master communication node and the communication node 28 is hereinafter designated the slave communication node.

Figure 2:
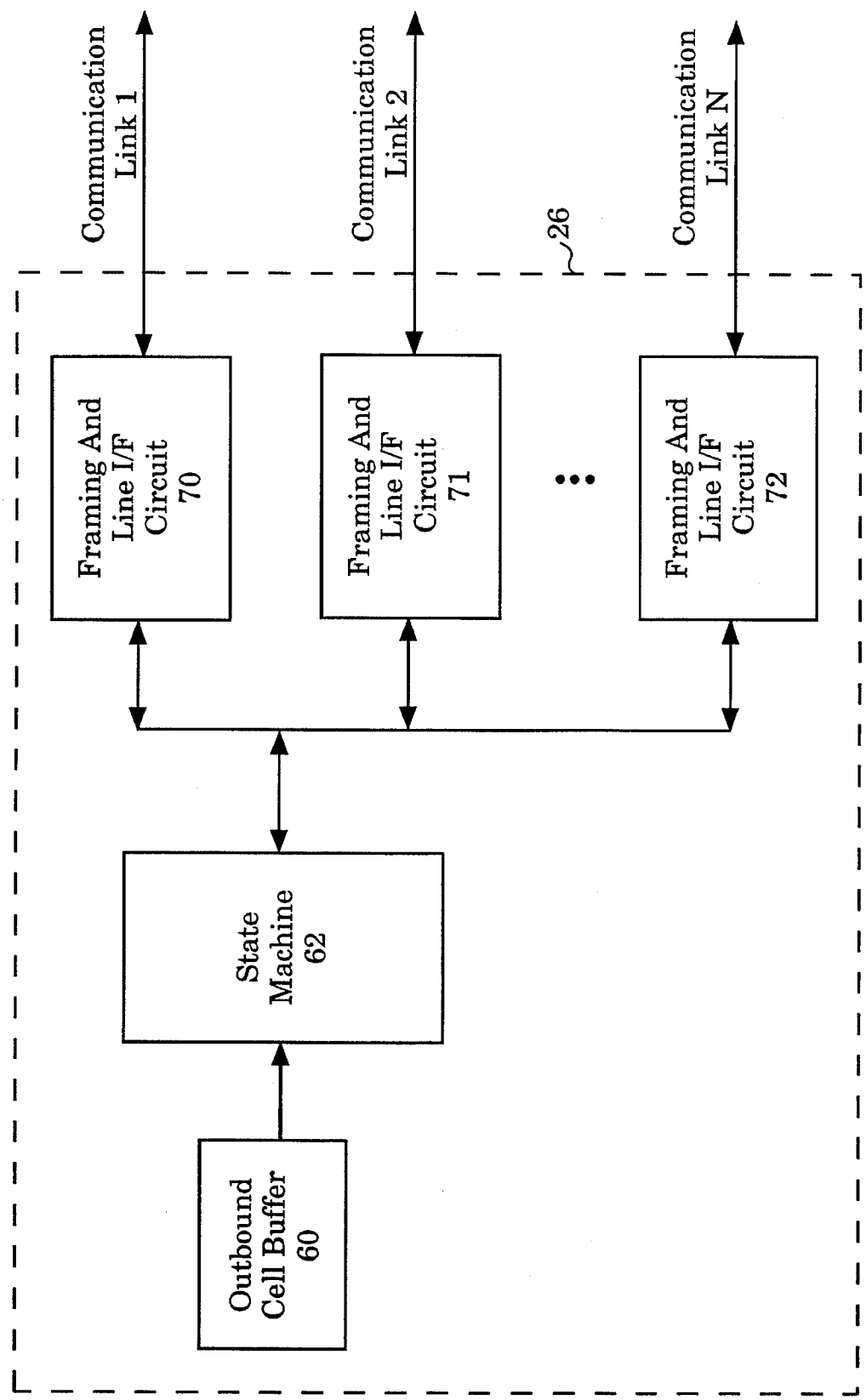
FIG. 2 illustrates the outbound communication portions of a communication node for one embodiment including an outbound cell buffer, a state machine, and a set of framing and line interface (I/F) circuits.

FIG. 2 illustrates outbound communication portions of the communication node 26 for one embodiment. The portions of the communication node 26 involved in outbound communication cell transfer over the communication links 1–N comprise an outbound cell buffer 60, a state machine 62, and a set of framing and line interface (I/F) circuits 70–72.

The outbound cell buffer 60 buffers outbound communication cells for transfer to the communication node 28. The state machine 62 sequences the outbound communication cells from the outbound cell buffer 60 to the framing and line interface circuits 70–72 in a round robin fashion that defines the inverse multiplexed outbound communication cell sequence.

The state machine 62 inserts idle communication cells into the outbound communication cell streams on the communication links 1–N if outbound communication cells are not available from the outbound cell buffer 60. The idle cells maintain the data rate available on each communication link 1–N.

The state machine 62 also performs a master framing function for the inverse multiplexed outbound communication cells by manipulating individual bits of each outbound communication cell. In addition, the state machine 62 manipulates individual bits in each outbound communication cell to perform channel control messaging to the communication node 28.

For one embodiment, the framing and line interface circuits 70–72 perform T1 framing functions and line interface functions for transmitting outbound communication cells over the communication links 1–N.

Figure 3:
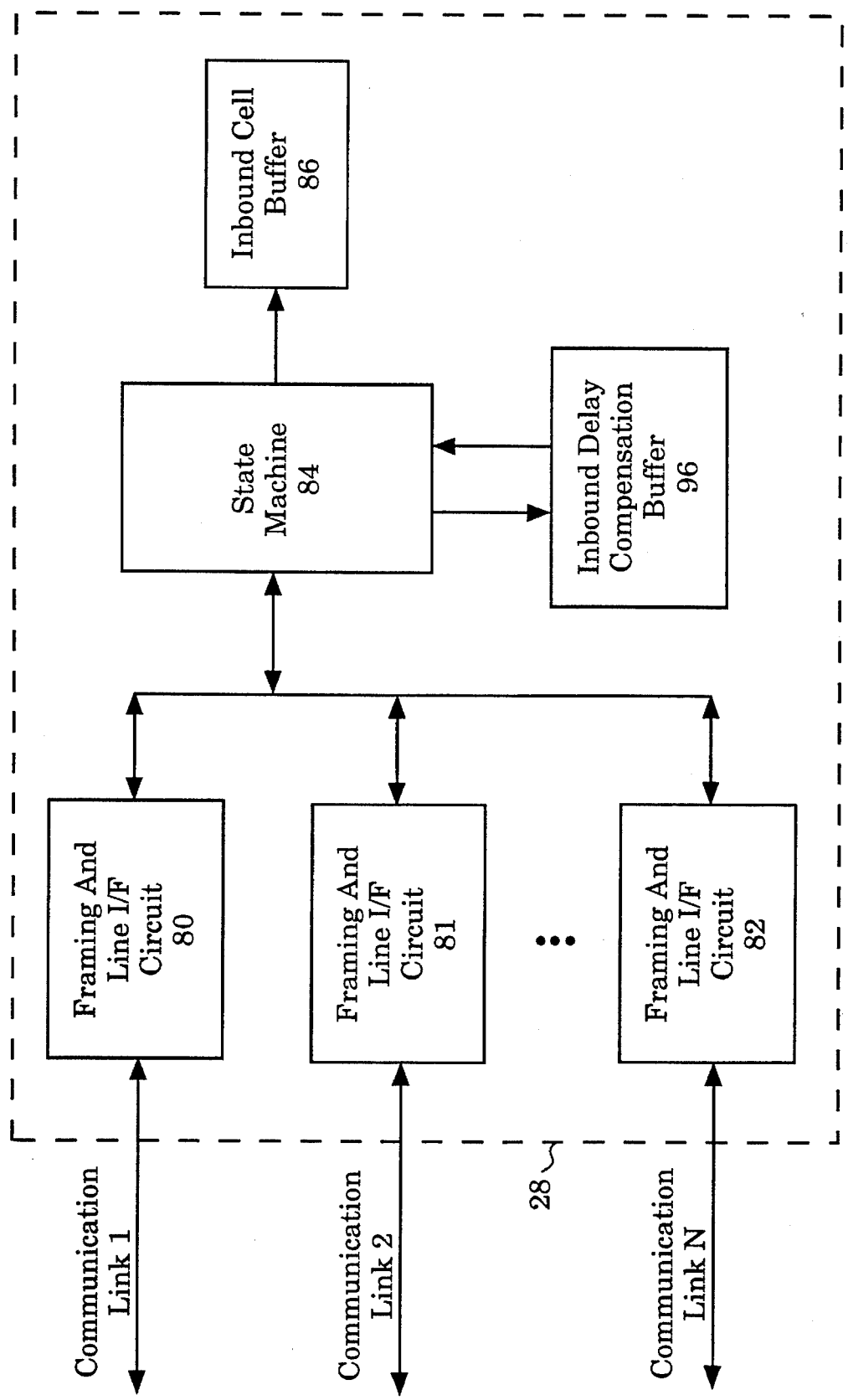
FIG. 3 illustrates the inbound communication portions of a communication node including a set of framing and line interface circuits, a state machine, and an inbound delay compensation.

FIG. 3 illustrates inbound communication portions of the communication node 28 for one embodiment. The inbound communication portions of the communication node 28 comprise a set of framing and line interface circuits 80–82, a state machine 84, an inbound delay compensation buffer 96, and an inbound cell buffer 86.

The framing and line interface circuits 80–82 receive communication cells over the communication links 1–N and perform line interface and T1 framing functions for the communication links 1–N.

The state machine 84 sequences the inbound communication cells from the framing and line interface circuits 80–82 into the inbound delay compensation buffer 96. The state machine 84 filters out idle communication cells received over the communication links 1–N. The state machine 84 extracts the inbound master framing sequence on each communication link 1–N and stores the inbound communication cells into inbound delay compensation buffer 96 according to the corresponding master framing sequence. The state machine 84 also extracts the channel control messages for the inbound communication cells transferred via the communication links 1–N.

The inbound delay compensation buffer 96 accommodates full master framing sequences of inbound communication cells and thereby permits delay compensation among the communication links 1–N. Accordingly, the size of the delay compensation buffer 96 varies according to the length of master framing sequence required for the maximum permissible differential delay.

FIG. 4 illustrates the format of each communication cell transferred over the communication links 1–N. Each communication cell comprises 53 bytes including a 5 byte header and a 48 byte payload. The 5 byte header includes an 8 bit cyclic redundancy check (CRC 8).

The header of each communication cell includes a bundle framing (BF) bit and a channel control (CC) bit. The bundle framing bits of the communication cell streams transferred over the communication links 1–N provides a master framing sequence for each of the communication links 1–N. The channel control bits of the communication cell streams transferred over the communication links 1–N provides control messages between the communication nodes 26 and 28 via each of the communication links 1–N.

For one embodiment, the bundle framing and channel control bits are located within the generic flow control (GFC) nibble of each communication cell header. For other embodiments, the bundle framing bit and the control channel bit may be located within the virtual path identifier (VPI) or virtual circuit identifier (VCI) portions of the communication cell headers.

Figure 5:
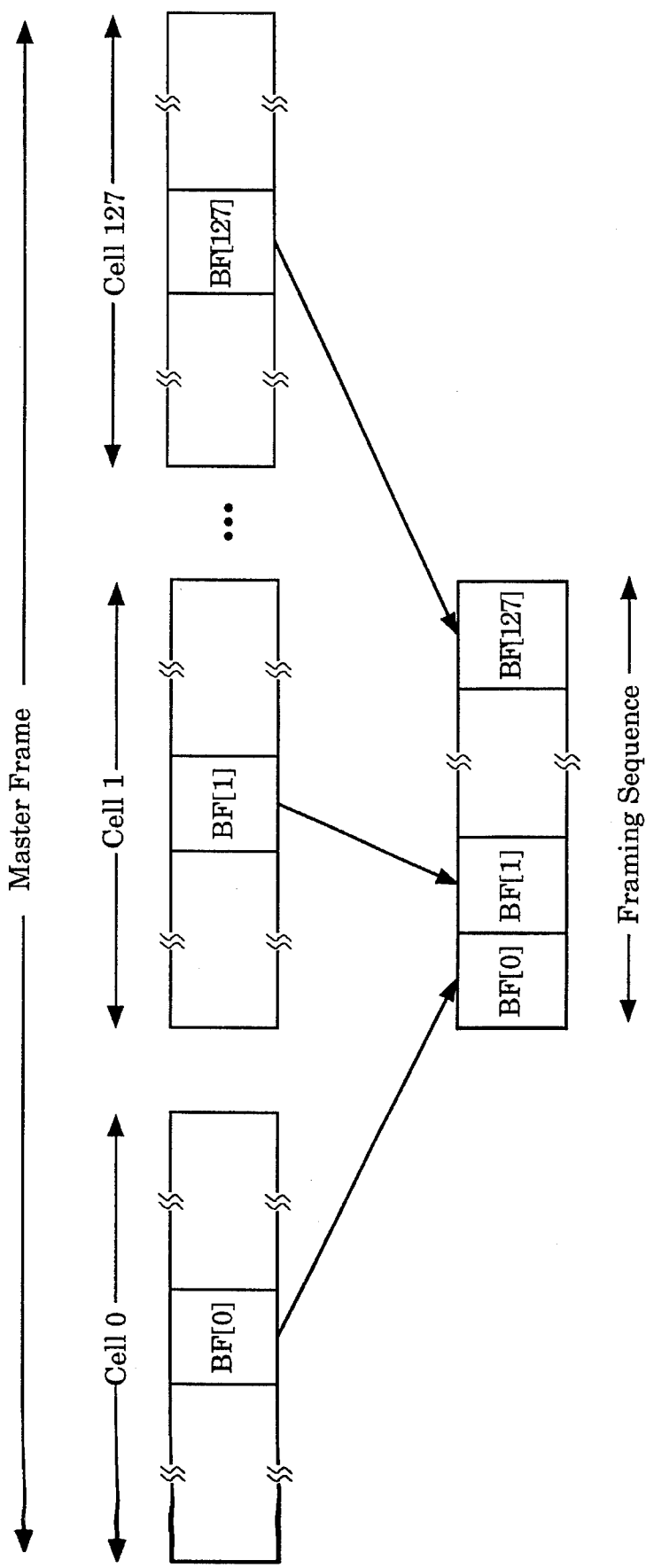
FIG. 5 illustrates the master framing bit stream carried over each of the communication links 1–N for one embodiment wherein the master framing bit stream comprises a bundle framing bit from each of a series of 128 communication cells (shown as cell 0–cell 127) carried over each of the communication links.

FIG. 5 illustrates the master framing bit stream carried over each of the communication links 1–N for one embodiment. The master framing bit stream comprises a bundle framing bit from each of a series of 128 communication cells (shown as cell 0–cell 127) carried over each of the communication links 1–N. A series of 128 communication cells aligned to the master framing bit stream is referred to as a master frame. The receiving communication node extracts the inbound bundle framing bits BF[0]–BF[127] to identify master frame boundaries.

The master framing bit stream is used to align the inbound communication cells into the delay compensation buffer 96. The bit phase alignment between the bits of the master framing bit stream and the bundle framing bits in each of the series of 128 inbound communication cells in each master frame determines the placement of the inbound communication cells within the inbound delay compensation buffer 96. The master framing bit stream enables the state machine 84 to properly align master frames of 128 inbound communication cells in to the inbound delay compensation buffer 96 for each of the communication links 1–N.

Figure 6:
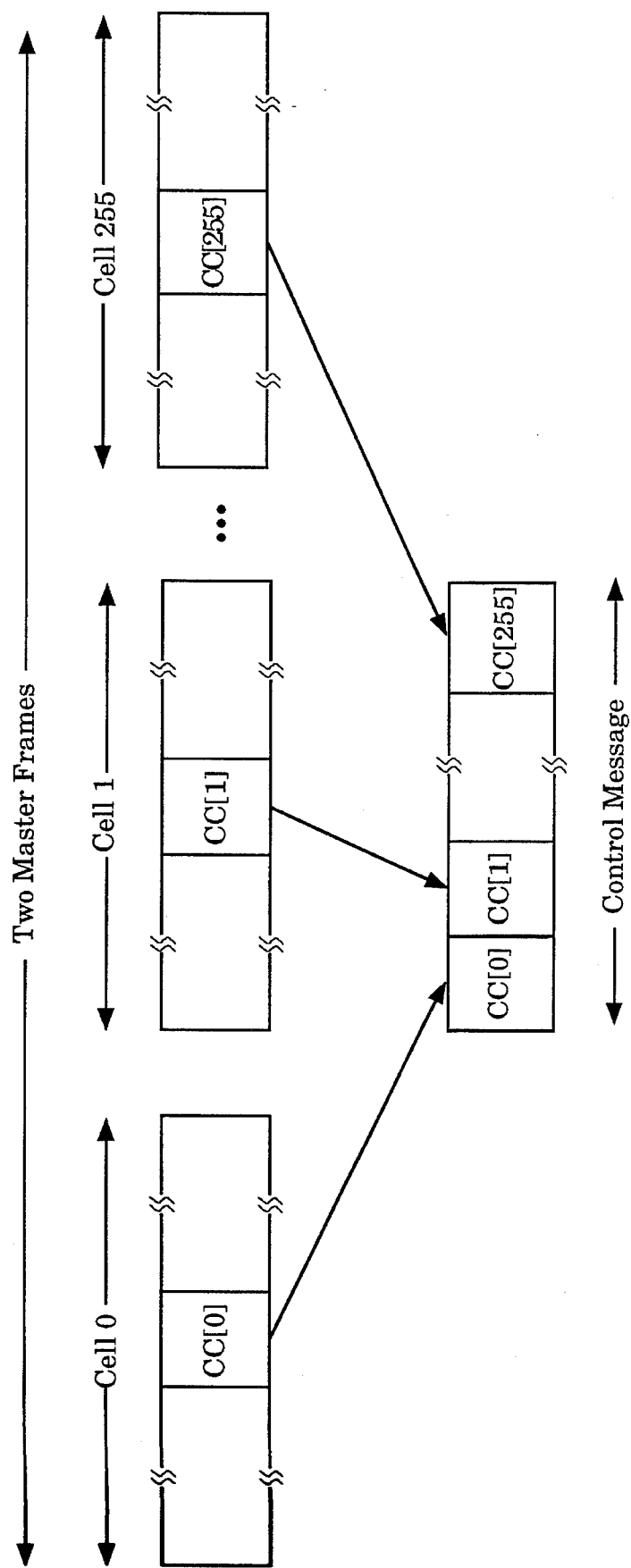
FIG. 6 illustrates the control message transferred over each of the communication links wherein the control messages are carried via two master frames of inbound communication cells over each of the communication links.

FIG. 6 illustrates a control message transferred over each of the communication links 1–N. The control message is carried via two master frames of inbound communication cells over each of the communication links 1–N. Two master frames are shown comprising a set of 256 communication cells shown as cell 0–cell 256.

The receiving communication node extracts the channel control bit from each communication cell in the two master frames and assembles the channel control bits into a control message. The control message comprises a channel control bit CC[0]–CC[255] from the two master frames of inbound communication cells. Each of the communication links 1–N is capable of carrying a control message every 2 master frames via the corresponding channel control bits.

FIG. 7 illustrates the format of a master framing bit stream for one embodiment. The master framing sequence is used to determine the relative transmission delays among the communication links 1–N and to realign the cell streams transmitted over the communication links 1–N into the inbound cell alignment buffer 86. Each master frame is subdivided into 16 subframes (subframe 0–subframe 15). Each of the subframes 0–15 comprise the bundle framing (BF) bits from eight communication cells. Subframes 0–2 are shown along with corresponding bundle framing bits. The subframes 0–15 are delineated by an eight bit bundle framing pattern for each set of eight successive communication cells in each subframe. The bundle framing bits in the first four communication cells of a master frame comprise the bit pattern 101x. The next four bundle framing bits in each subframe provides a subframe number in the range 0–15.

The bundle framing bit in communication cell number 3 in a master frame sequence is set to zero to indicate the beginning of a control channel message via the channel control (CC) bit stream. For one embodiment, one channel control message is transmitted every two master frames over each of the communication links 1–N.

The 128 bit master framing bit stream enables delay compensation and realignment among the communication links 1–N for permissible differential delays of up to 32 milliseconds for T1 communication links. The permissible differential delay of up to 32 milliseconds enables delay compensation if the communication links 1–N are terrestrial T1 communication links. The permissible differential delay of up to 32 milliseconds is also sufficient if failed terrestrial T1 communication links are replaced with terrestrial T1 communication links.

For an alternative embodiment, the transmitting communication node overlays another 128 bit framing pattern on top of the 128 bit master framing bit stream shown in FIG. 7. The top 128 bit framing pattern is overlaid onto the master framing bit stream shown via the don't care (x) bit positions located in the bundle framing bit sequence in the first four communication cells of a master frame which comprise the bit pattern 101x. The don't care (x) bit positions of 128 sequential master framing bit streams provide the overlaid 128 bit framing pattern for extended differential delays.

The 128 bit flaming pattern overlaid onto the 128 bit master framing bit stream enables delay compensation and realignment among the communication links 1–N at the receiving communication node for permissible differential delays of up to 4 seconds for T1 communication links. The permissible differential delay of 4 seconds enables delay compensation if a subset of the communication links 1–N are satellite T1 communication links or if any of the failed terrestrial T1 communication links are replaced with satellite T1 communication links.

FIG. 8 illustrates the control channel message format for one embodiment. The control channel (CC) bit stream carries fixed length control messages between the master communication node 26 and the slave communication node 28. The master communication node 26 assigns a link identifier (LID) to each communication link 1–N.

The master communication node 26 transmits configuration information and state information to the slave communication node 28. The configuration and state information enables the slave communication node 28 to reconstruct the inversed multiplexed cell stream transmitted over the communication links 1–N. The master communication node 26 also transmits control messages to the slave communication node 28 via the control channel bit stream to update configuration and state information as communication links are added or deleted to the group of communication links 1–N.

The control channel message assigns one of the communication links 1–N as the "primary" communication link. The link state (STATE) information transferred via the channel control message indicates whether corresponding communication link 1–N is blocked or deleted from the active inverse multiplex group. Channel control messages specify the number of active communication links 1–N and the sequence of link identifiers in the active inverse multiplex group on the communication links 1–N. Channel control messages identify a new primary communication link if the previous primary communication link fails. Control channel messages also specify deleted failed communication links from the active group of inverse multiplex communication links 1–N. In addition, channel control messages are used to undelete or restore previously failed communication links to active group of inverse multiplex communication links 1–N.

Each channel control message comprises 256 bits arranged as a set of 32 octets. Channel control messages carried via the communication links 1–N that are not primary links use only the first four octets out of the 32 octets in a control message. The remaining octets for such control messages are set to zero.

Channel control messages on the primary communication link of the communication links 1–N carries the complete configuration information for the communication links 1–N. The octets 5–32 of a channel control message on the primary communication link indicates the logical order of link identifiers for the active inversed multiplexed group. The logical order of link identifiers provided by the channel control message enables the proper resequencing of communication cells from the inbound cell alignment buffer 86.

Table 1 lists the format of a control message header for one embodiment. The control message header is contained in octet 1 of a control message. The header of a control message includes a bit that indicates whether the transmitting communication node is a master or a slave communication node and a bit indicating whether the corresponding communication link 1–N is assigned as a primary communication link or a nonprimary communication link.

TABLE 1

| BITS | Octet 1 | HEADER |
|---|---|---|
| 7–4 | 1111: Fixed Preamble | |
| 3 | 1: Master side | |
| | 0: Slave side | |
| 2 | 1: Link assigned as 'Primary' | |
| | 0: Link non-primary | |
| 1–0 | 00: CC msg. | |
| | 01: User to User message | |

Table 2 lists the format of octet 2 of a control message which provides link identifier and state information. The state information in octet 2 indicates whether the corresponding communication link 1–N is deleted from an active list of communication links or is blocked due to a communication link failure. Octet 2 also specifies the link identifier for the corresponding communication link 1–N.

TABLE 2

| BITS | Octet 2 Definition | Link ID & STATE |
|---|---|---|
| 7 | 0: Link In Service | |
|   | 1: Link "DELETED" | |
| 6 | 1: Link In Service | |
|   | 0: Link "BLOCKED" | |
| 5 | 1: Cell Payload Scrambling disabled | |
|   | 0: Cell Payload Scrambled | |
| 4–0 | Link ID 00: Unassigned. | |

Table 3 lists the format of octet 3 of a control message for one embodiment. Octet 3 carries state information for the inverse multiplexed communication links 1–N.

TABLE 3

| BITS | Octet 3 | STATE |
|---|---|---|
| 7 | 0: Default (CC message valid) | |
|   | 1: Error in CC msg. (mastership conflict, incorrect LIDs . . . ) | |
| 6–4 | 0: Not Used | |
| 3–0 | State Information | |

Table 4 illustrates the format of octet 4 of a communication message for one embodiment. Octet 4 specifies the maximum number of active links available in the set of communication links 1–N.

TABLE 4

| BITS | Octet 4 | Maxlinks |
|---|---|---|
| 7–5 | Not Used | |
| 4–0 | Max. number of Links assigned 00: Unassigned. | |

Table 5 lists the format of octets 5–32 of a control message for one embodiment. Octets 5–32 provide link identifier and state information for the communication links 1–N. Each communication link 1–N corresponds to one of the octets in the octet range 5–32. Each octet 5–32 includes bits that indicate whether the corresponding communication link 1–N is deleted from the active group or is blocked. In addition, the octets 5–32 provide the sequence of link identifiers assigned by the master communication node 26.

TABLE 5

| BITS | Octet 5 . . . 32 | Link ID & STATE |
|---|---|---|
| 7 | 0: Link In Service | |
|   | 1: Link "DELETED" | |
| 6 | 0: Link In Service | |
|   | 1: Link "BLOCKED" | |
| 5 | 0: Cell Payload Scrambling disabled | |
|   | 1: Cell Payload Scrambled | |
| 4–0 | LID (Link ID) assigned by Master at connection time 00: Unassigned. | |

FIG. 9 illustrates a complete master framing sequence provided by the bundle flaming bits and a complete control message provided by the channel control bits of each communication cell transferred over each communication link 1–N. A master framing sequence comprises 128 communication cells on each communication link 1–N. A control message comprises 2 master framing sequences for a total control message length of 256 bits.

Figure 10:
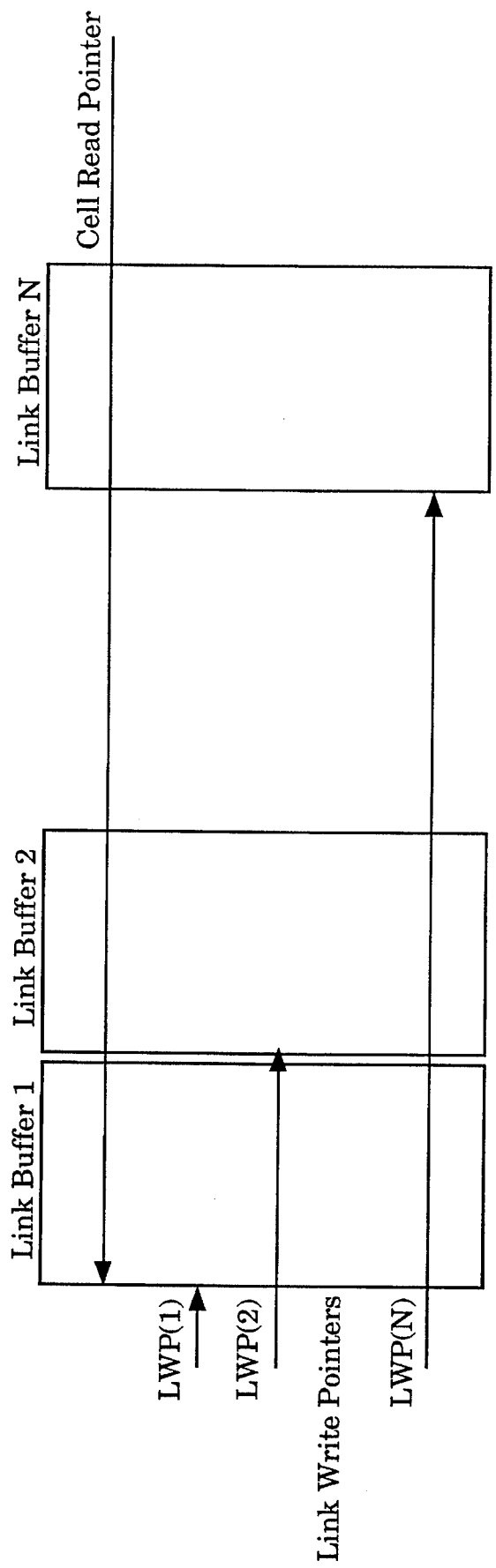
FIG. 10 illustrates the architecture of the inbound delay compensation buffer for one embodiment which comprises a set of link buffers that correspond to the communication links.

FIG. 10 illustrates the architecture of the inbound delay compensation buffer 96 for one embodiment. The inbound delay compensation buffer 96 comprises a set of link buffers 1–N. The link buffers 1–N correspond to the communication links 1–N. For one embodiment, each of the link buffers 1–N comprise a circular buffer.

The state machine 84 sequences each communication cell received over each communication link 1–N into the corresponding link buffer 1–N according to the corresponding master framing sequence. For example, the state machine 84 sequences each communication cell received over the communication link 1 into the link buffer 1 according to the master framing sequence for the communication link 1. The state machine 84 determines the location in the link buffer 1 for each inbound communication cell on the communication link 1 by examining the value of the corresponding bundle frame bit for the inbound communication cell in relation to the overall master framing sequence. Inbound communication cells on the communication links 2–N are sequenced in a similar manner into link buffers 2–N respectively.

The state machine 84 maintains a set of link write pointers (LWP) 1–N. Each link write pointer 1–N provides a write pointer into the corresponding link buffer 1–N. The state machine 84 updates the link write pointers 1–N as inbound communication cells are sequenced into the link buffers 1–N. The state machine 84 filters out idle inbound communication cells over the communication links 1–N.

Inbound communication cells are sequenced out of the inbound delay compensation buffer 96 and stored in the inbound cell buffer 86 in the original cell sequence using a cell read pointer. The cell read pointer follows the link write pointers 1–N around the link buffers 1–N in a circular fashion. The cell read pointer follows the link write pointer 1–N that corresponds to the communication link 1–N having the longest delay in communication cell transmission between the communication nodes 26 and 28. The master framing sequence on each communication link 1–N provides an indication of the relative phase delay for each of the communication links 1–N. The cell read pointer is only updated after an inbound communication cell corresponding to the communication link 1–N having the longest delay is stored into the inbound delay compensation buffer 96 in the appropriate link buffer 1–N.

Figure 11A:
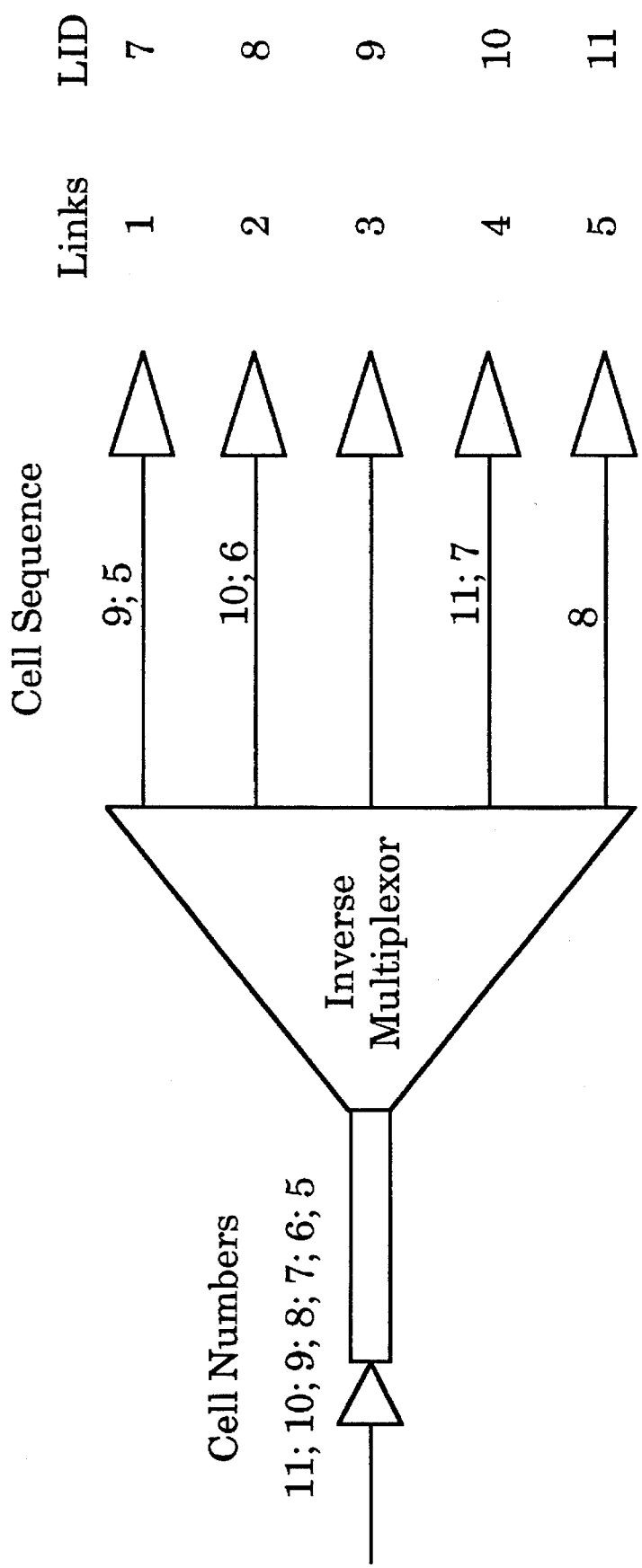
FIG. 11a illustrates a sequence of outbound communication cell numbers that comprise cell numbers 11, 10, 9, 8, 7, 6, and 5 from the outbound cell buffer.

FIGS. 11a and 11b illustrate an example arrangement of inverse multiplexed communication lines and corresponding control messages. For the example shown, the communication links 1–N correspond to communication links 1–5. The link identifiers assigned to the communication links 1–5 are link identifiers 7–11. The active communication links correspond to link identifiers 7, 8, 10, and 11.

FIG. 11a illustrates a sequence of communication cell numbers from the outbound cell buffer 60. The cell number sequence comprises cell numbers 11, 10, 9, 8, 7, 6, and 5. The outbound communication cell sequence on the communication links 1–5 is assigned in a round robin fashion over the active communication links corresponding to the link identifiers 7, 8, 10 and 11.

FIG. 11b illustrates the format of a control message carried over each of the communication links corresponding to the link identifiers 7, 8, 10 and 11. For this example, the communication link corresponding to the link identifier equal to 7 is designated at the primary communication link which carries the entire configuration message.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. An asynchronous transfer mode communication method, comprising the steps of:

transferring a series of communication cells over each of a set of communication links while manipulating a framing bit in each communication cell such that the framing bits provide a predetermined framing bit stream for each communication link;

manipulating a control channel bit in each communication cell while transferring the communication cells over each communication link such that the control channel bits provide a control message for each communication link, the control message specifying an ordered list of logical identifiers, one logical identifier for each communication link, such that the ordered list indicates a multiplexed sequence of transfer of the communication cells over the communication links;

receiving the communication cells over the communication links and aligning the received communication cells from each communication link according to the corresponding framing bit stream; and deleting a failed communication link from the set of communication links by deleting the logical identifier for the failed communication link from the ordered list, wherein the control message specifies a failed communication link.

2. The method of claim 1, further comprising the step of restoring the failed communication link to the set of communication links by adding the logical identifier for the failed communication link to the ordered list.

3. An asynchronous transfer mode communication system, comprising:

means for transferring a series of communication cells over each of a set of communication links while manipulating a framing bit in each communication cell such that the framing bits provide a predetermined framing bit stream for each communication link;

means for receiving the communication cells over the communication links and aligning the received communication cells from each communication link according to the corresponding framing bit stream;

means for manipulating a control channel bit in each communication cell while transferring the communication cells over each communication link such that the control channel bits provide a control message for each communication link, the control message specifying an ordered list of logical identifiers, one logical identifier for each communication link, such that the ordered list indicates a multiplexed sequence of transfer of the communication cells over the communication links; and means for deleting a failed communication link from the set of communication links by deleting the logical identifier for the failed communication link from the ordered list.

4. The communication system of claim 3, further comprising means for restoring the failed communication link to the set of communication links by adding the logical identifier for the failed communication link to the ordered list.

5. A communication system, comprising:

a first communication node coupled for communication over each of a set of communication links according to an asynchronous transfer mode protocol, the first communication node accessing a series of communication cells according to an outbound cell sequence and transferring the communication cells over the communication links as a plurality of flaming bit streams according to an inverse multiplexed sequence; and a second communication node coupled to receive the communication cells over the communication links and reconstruct the outbound cell sequence of the communication cells while compensating for differential delays among the communication links, wherein the first communication node transfers the series of communication cells over the communication links in the inverse multiplexed sequence while manipulating a framing bit in each communication cell such that the framing bits provide a predetermined framing bit stream for each communication link, wherein the second communication node receives the communication cells over the communication links and aligns the received communication cells from each communication link according to the corresponding framing bit stream, wherein the first communication node manipulates a control channel bit in each communication cell while transferring the communication cells over each communication link such that the control channel bits provide a control message to the second communication node, wherein the control message specifies an ordered list of logical identifiers, one logical identifier for each communication link, such that the ordered list indicates a multiplexed sequence of transfer of the communication cells over the communication links, and wherein the first communication node deletes a failed communication link from the set of communication links by deleting the logical identifier for the failed communication link from the ordered list.

6. The communication system of claim 5, wherein the first communication node restores the failed communication link to the set of communication links by adding the logical identifier for the failed communication link to the ordered list.

\* \* \* \* \*